United States Patent
Faigle

[19]

[11] Patent Number: 6,076,852
[45] Date of Patent: *Jun. 20, 2000

[54] INFLATABLE RESTRAINT INFLATOR WITH FLOW CONTROL VALVE

[75] Inventor: Ernst M. Faigle, Dryden, Mich.

[73] Assignee: TRW Vehicle Safety Systems Inc., Lyndhurst, Ohio

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/906,042

[22] Filed: Aug. 5, 1997

[51] Int. Cl.[7] .................................................. B60R 21/26
[52] U.S. Cl. ............................................ 280/735; 280/736
[58] Field of Search .................................. 280/736, 737, 280/740, 741, 742, 735

[56] References Cited

U.S. PATENT DOCUMENTS

| | | | |
|---|---|---|---|
| 3,741,584 | 6/1973 | Arai | 280/735 |
| 3,822,724 | 7/1974 | Clapp et al. . | |
| 3,985,375 | 10/1976 | Lewis et al. | 280/737 |
| 4,006,919 | 2/1977 | Neuman | 280/736 |
| 4,021,058 | 5/1977 | Suzuki et al. | 280/737 |
| 4,258,931 | 3/1981 | Lee et al. . | |
| 5,161,776 | 11/1992 | Nicholson . | |
| 5,224,733 | 7/1993 | Simsic . | |
| 5,348,344 | 9/1994 | Blumenthal et al. | 280/737 |
| 5,413,378 | 5/1995 | Steffens, Jr. et al. | 280/735 |
| 5,494,312 | 2/1996 | Rink . | |
| 5,551,723 | 9/1996 | Mahon et al. | 280/737 |
| 5,566,976 | 10/1996 | Cuevas | 280/737 |
| 5,582,425 | 12/1996 | Skanberg et al. | 280/736 |
| 5,609,359 | 3/1997 | Johnson et al. | 280/736 |
| 5,707,078 | 1/1998 | Swanberg et al. | 280/736 |
| 5,779,266 | 7/1998 | Moore et al. . | |
| 5,803,492 | 9/1998 | Rink et al. . | |
| 5,836,610 | 11/1998 | Rink et al. . | |
| 5,927,753 | 7/1999 | Faigle et al. | 280/735 |

FOREIGN PATENT DOCUMENTS

| | | |
|---|---|---|
| 0745517 | 12/1996 | European Pat. Off. . |
| 55-20282 | 7/1953 | Japan . |
| 48-5021 | 1/1973 | Japan . |
| 52-140134 | 11/1977 | Japan . |
| 7329692 | 12/1995 | Japan . |
| 9175315 | 7/1997 | Japan . |
| 4224927 | 2/1994 | United Kingdom . |
| 2275100 | 8/1994 | United Kingdom . |
| WO97/34785 | 9/1997 | WIPO . |

OTHER PUBLICATIONS

U.S. Patent Application Serial No. 08/990,590, filed Dec. 15, 1997, entitled "Vehicle Occupant Protection Apparatus".
U.S. Patent Application Serial No. 09/046,467, filed Mar. 23, 1998, entitled "Vehicle Occupant Protection Apparatus".

*Primary Examiner*—Peter C. English
*Attorney, Agent, or Firm*—Tarolli, Sundheim, Covell, Tummino & Szabo L.L.P.

[57] ABSTRACT

An apparatus (10) includes a pressure vessel (16) comprising a source of inflation fluid, and a solenoid valve (24) which regulates an outlet flow of the inflation fluid from the pressure vessel (16). The solenoid valve (24) normally has an open condition providing an initial outlet flow area. The apparatus (10) responds to a vehicle crash by controlling the solenoid valve (24) in a selected one of a plurality of differing stages corresponding to a plurality of differing conditions. The different stages include a stage in which the solenoid valve (24) is not shifted from the open condition, and further include a stage in which the solenoid valve (24) is shifted to a further opened condition providing a subsequent outlet flow area greater than the initial outlet flow area.

3 Claims, 2 Drawing Sheets

INFLATABLE RESTRAINT INFLATOR WITH FLOW CONTROL VALVE

FIELD OF THE INVENTION

The present invention relates to an apparatus for deploying an inflatable vehicle occupant protection device.

BACKGROUND OF THE INVENTION

An inflatable vehicle occupant protection device, such as an air bag, is deployed upon the occurrence of a vehicle crash. The air bag is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment. When the air bag is deployed in this manner, it helps to protect an occupant of the vehicle from a forceful impact with parts of the vehicle as a result of the crash.

The manner in which the inflating air bag affects movement of the vehicle occupant can be influenced by factors such as the force with which the occupant moves against the air bag and the pressure of the inflation fluid in the air bag. Those factors, in turn, can be influenced by vehicle conditions, such as the severity of the crash, and/or by vehicle occupant conditions, such as the size, weight and position of the occupant.

SUMMARY OF THE INVENTION

In accordance with the present invention, an apparatus comprises a pressure vessel and a solenoid valve. The pressure vessel comprises a source of inflation fluid. The solenoid valve regulates an outlet flow of inflation fluid from the pressure vessel, and normally has an open condition providing an initial outlet flow area.

The apparatus further comprises control means for responding to a vehicle crash by controlling the solenoid valve in a selected one of a plurality of differing stages corresponding to a plurality of differing conditions. The different stages include a stage in which the control means does not shift the solenoid valve from the open condition. The differing stages further include a stage in which the control means shifts the solenoid valve to a further opened condition providing a subsequent outlet flow area greater than the initial outlet flow area.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
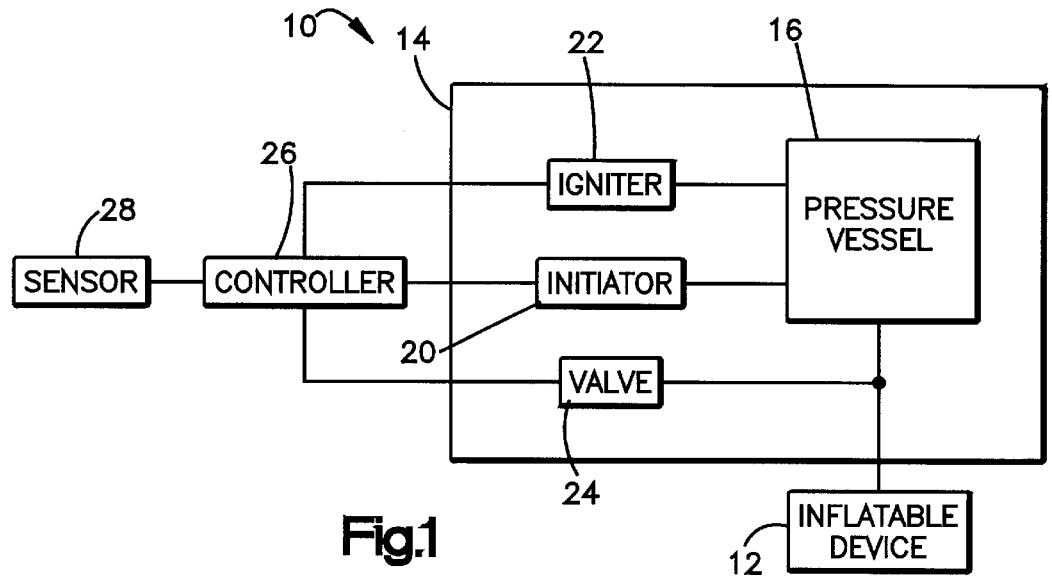
FIG. 1 is a schematic view of a vehicle occupant protection apparatus comprising a first embodiment of the invention.

A vehicle occupant protection apparatus 10 comprising a first embodiment of the present invention is shown schematically in FIG. 1. The apparatus 10 includes an inflatable vehicle occupant protection device 12. In the first embodiment of the invention, the protection device 12 is an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. The apparatus 10 further includes an inflator 14 which comprises a source of inflation fluid for inflating the air bag 12. When the air bag 12 is inflated, it extends into a vehicle occupant compartment (not shown) to help protect a vehicle occupant from a forceful impact with parts of the vehicle as a result of a crash.

The inflator 14 may contain ignitable gas generating material for generating a large volume of inflation gas. The inflator 14 may alternatively contain a stored quantity of pressurized inflation fluid, or a combination of pressurized inflation fluid and ignitable material for heating the inflation fluid. For example, in the preferred embodiments of the present invention, the inflator 14 includes a pressure vessel 16 which stores a pressurized, combustible mixture of gases comprising inflation fluid for inflating the air bag 12.

The inflator 14 has a plurality of parts that cooperate to initiate and regulate an outlet flow of inflation fluid from the pressure vessel 16 to the air bag 12. As shown schematically in FIG. 1, these parts include an initiator 20, an igniter 22, and a valve 24. A controller 26 actuates the initiator 20, the igniter 22, and the valve 24 in response to a deployment signal received from a crash sensor 28.

The combustible mixture of gases stored in the pressure vessel 16 includes primary gas and fuel gas. The fuel gas provides heat of combustion which heats the primary gas. This mixture of gases may have any suitable composition known in the art, but preferably has a composition in accordance with the invention set forth in U.S. Pat. No. 5,348,344 to Blumenthal et al., entitled APPARATUS FOR INFLATING A VEHICLE OCCUPANT RESTRAINT USING A MIXTURE OF GASES, and assigned to TRW Vehicle Safety Systems Inc. Accordingly, the primary gas preferably includes inert gas for inflating the air bag 12 and oxidizer gas for supporting combustion of the fuel gas. The inert gas preferably comprises the majority of the inflation fluid that is stored in the pressure vessel 16 for inflation of the air bag 12, and may be nitrogen, argon or a mixture of nitrogen and argon. For example, the primary gas may be air, with the oxidizer gas being the oxygen in the air. The fuel gas may be hydrogen, methane, or a mixture of hydrogen and methane. Preferably, the fuel gas is hydrogen. A preferred composition of the mixture of gases is about 13% by volume hydrogen and about 87% by volume air. Although the storage pressure may vary, it is preferably within the range of about 1,500 psig to about 5,000 psig, and is most preferably about 3,000 psig.

The crash sensor 28 is a known device which senses a vehicle condition that indicates the occurrence of a crash. If the vehicle condition sensed by the crash sensor 28 is at or above a predetermined threshold level, it indicates the occurrence of a crash having at least a predetermined threshold level of severity. The threshold level of crash severity is a level at which inflation of the air bag 12 is desired for protection of a vehicle occupant. The crash sensor 28 then provides the controller 26 with a deployment signal.

The vehicle condition sensed by the crash sensor 28 preferably comprises sudden vehicle deceleration that is caused by a collision. The magnitude and duration of the deceleration are measured by the crash sensor 28. If the magnitude and duration of the deceleration meet or exceed predetermined threshold levels, they indicate the occurrence of a crash that meets or exceeds the predetermined threshold level of crash severity. The deployment signal is then transmitted to the controller 26 to indicate the occurrence of such a crash. Additionally, the deployment signal has a value which indicates the degree to which the magnitude and duration of the vehicle deceleration exceed the corresponding threshold levels. The deployment signal thus indicates both the occurrence and severity of a crash for which the air bag 12 is to be inflated.

The controller 26, which may comprise a known microprocessor, actuates the initiator 20 upon receiving the deployment signal from the crash sensor 28. The controller 26 actuates the igniter 22 and the valve 24 with reference to the value of the deployment signal received from the crash sensor 28. The controller 26 thus responds to a vehicle crash in a stage that is selected by the controller 26 with reference to both the occurrence and the severity of the crash. As described fully below, this initiates an outlet flow of inflation fluid from the pressure vessel 16 upon the occurrence of a crash, and causes the inflation fluid to flow from the pressure vessel 16 at flow rates that are correlated to the severity of the crash so that the air bag 12 is deployed accordingly.

Figure 2:
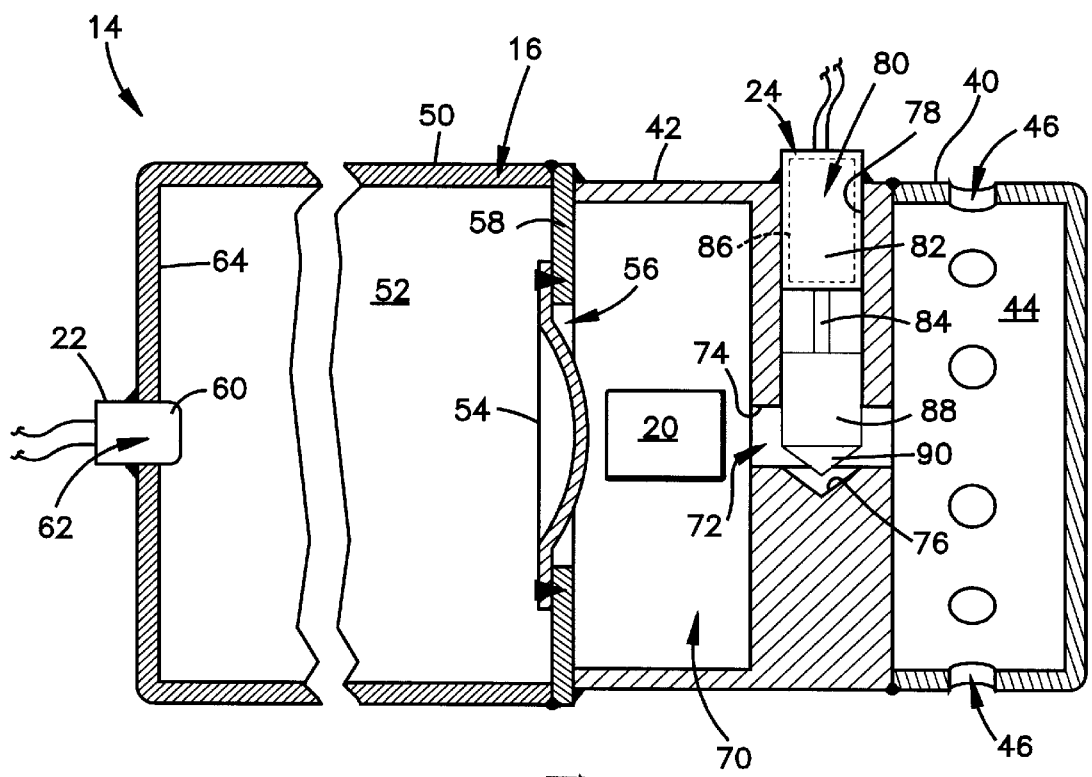
FIG. 2 is a side view, partly in section, of parts of the apparatus of FIG. 1.

The inflator 14 has the structure shown by way of example in FIG. 2. Accordingly, the inflator 14 further includes a diffuser 40 and a valve housing 42. The diffuser 40 defines a diffuser chamber 44, and has a plurality of inflation fluid outlet openings 46 which direct inflation fluid from the inflator 14 toward the air bag 12. The valve housing 42 supports the valve 24 at a location between the pressure vessel 16 and the diffuser 40.

The pressure vessel 16 comprises a cylindrical tank 50 defining a storage chamber 52 containing the combustible mixture of gases. A rupturable closure wall 54, which preferably comprises a burst disk of known construction, closes an outlet opening 56 in an end wall 58 of the tank 50. The initiator 20 (shown schematically) may comprise any suitable initiating device known in the art. When the initiator 20 is actuated, it ruptures the burst disk 54 to open the pressure vessel 16. The inflation then begins to flow outward from the storage chamber 52 through the outlet opening 56.

The igniter 22 also may have any suitable structure known in the art, but preferably comprises a particular type of electrically actuatable device which is known as a squib. The igniter 22 thus has a cylindrical casing 60 containing a small charge of pyrotechnic material. The casing 60 extends closely through an aperture 62 in an opposite end wall 64 of the tank 50, and projects from the end wall 64 into the storage chamber 52.

When the igniter 22 is actuated, the pyrotechnic material in the casing 60 is ignited and produces combustion products including heat and hot particles. The combustion products are spewed from the casing 60 into the storage chamber 52 to ignite the mixture of gases in the storage chamber 52. The heat generated by combustion of the fuel gas causes the fluid pressure in the storage chamber 52 to increase rapidly to elevated levels that are substantially greater than the storage pressure. The increased pressure levels cause corresponding increases in the flow rate at which the inflation fluid emerges from the outlet opening 56.

As noted above, the controller 26 actuates the initiator 20 upon receiving the deployment signal from the crash sensor 28. The controller 26 then actuates the igniter 22 at a time that is selected with reference to the crash severity indicated by the deployment signal. For example, if the deployment signal indicates that the vehicle is experiencing a crash of a low severity, the controller 26 may actuate the igniter 22 after the lapse of a delay time following actuation of the initiator 20. The delay time provides a corresponding amount of "soft" inflation of the air bag 12 before the outlet flow rate is increased by actuation of the igniter 22. The controller 26 may determine the delay time by selecting from a look-up table based on empirically derived values of crash severity. The controller 26 may alternatively determine the delay time as a result of a computation based on a predetermined functional relationship between crash severity and delay time. In any case, the delay time will affect the amount of fuel gas remaining in the storage chamber 52 when the igniter 22 is actuated, and will thus affect the increased pressure levels and outlet flow rates attained following actuation of the igniter 22.

If the deployment signal indicates that the vehicle is experiencing a crash of a high severity, the controller 26 may select a stage in which the initiator 20 and the igniter 22 are actuated simultaneously, i.e., with a delay time of zero. This will cause the fluid pressure in the storage chamber 52 to reach elevated levels, with correspondingly greater outlet flow rates, more rapidly.

The valve housing 42 defines a fluid flow space 70 extending from the outlet opening 56 to the diffuser chamber 44. A portion 72 of the fluid flow space 70 comprises a conduit 72. The conduit 72 is defined in part by a cylindrical inner surface 74 of the valve housing 42, and in part by a conical inner surface 76 of the valve housing 42. The conical inner surface 76 is recessed from the cylindrical inner surface 74. Another cylindrical inner surface 78 of the valve housing 42 defines a cylindrical bore 80 extending from the conduit 72 at a location opposite the conical inner surface 76.

The valve 24 is a fast acting solenoid valve. As shown in FIG. 2, the valve 24 is received in the bore 80 in the valve housing 42. Specifically, the valve 24 has a cylindrical casing 82 received closely within the bore 80. An armature 84 projects from the casing 82, and is movable longitudinally under the influence of a magnetic field generated by a solenoid 86 in the casing 82.

A cylindrical valve head 88 is mounted on the end of the armature 84 for movement with the armature 84. The valve head 88 projects from the bore 80 into the conduit 72. A conical end surface 90 of the valve head 88 faces the conical inner surface 76 of the valve housing 42. The conical surfaces 76 and 90 have the same contour so that the conical inner surface 76 can function as a valve seat for the valve head 88.

The valve 24 is normally open. The valve 24 thus provides an initial outlet flow area through the conduit 72 between the valve head surface 90 and the valve seat surface 76. The valve 24 may, for example, normally have the open condition in which it is shown in FIG. 2. The valve head surface 90 then projects a short distance into the recess defined by the valve seat surface 76. However, the valve head surface 90 could be spaced farther from the valve seat surface 76 to provide a correspondingly greater initial outlet flow area.

Alternatively, the valve 24 may normally have a closed condition in which the valve head surface 90 mates with the valve seat surface 76. The valve head 88 would then extend fully across the conduit 72 to block the flow of inflation fluid through the conduit 72. However, the valve 24 in the preferred embodiments of the present invention normally has an open condition, as described above.

When the initiator 20 is actuated upon the occurrence of a vehicle crash, the outlet flow area initially provided by the valve 24 helps to maintain the soft stage of inflation by limiting the outlet flow rate through the conduit 72. If the crash severity is relatively low, the controller 26 may leave the valve 24 unactuated, i.e., in its normally open condition. However, the controller 26 responds to higher levels of crash severity by actuating the valve 24 so as to retract the valve head 88 into the bore 80. The valve head surface 90 is then moved farther from the valve seat surface 76. The valve 24 is thus shifted to a further opened condition in which it provides a subsequent outlet flow area which is greater than the initial outlet flow area. This enables the inflation fluid to flow outward through the conduit 72 at correspondingly greater flow rates under the influence of the elevated pressure levels attained in the storage chamber 52 following actuation of the igniter 22.

The controller 26 may direct the valve 24 to increase the outlet flow area by a predetermined amount at a predetermined time. The controller 26 may alternatively direct the valve 24 to increase the outlet flow area by an amount and/or at a time determined with reference to the crash severity indicated by the deployment signal received from the crash sensor 28. Moreover, the controller 26 may actuate the valve 24 after the lapse of a delay time following actuation of the initiator 20 or the igniter 22. Such a delay time could be determined in the same manner as described above with reference to actuation of the igniter 22. Importantly, movement of the valve head 88 occurs only under the direction of the controller 26 and is not affected by the inflation fluid pressure forces acting on the valve head 88 in the conduit 72. This ensures that the increased outlet flow area is provided at the time, and in the amount, determined by the controller 26.

Figure 3:
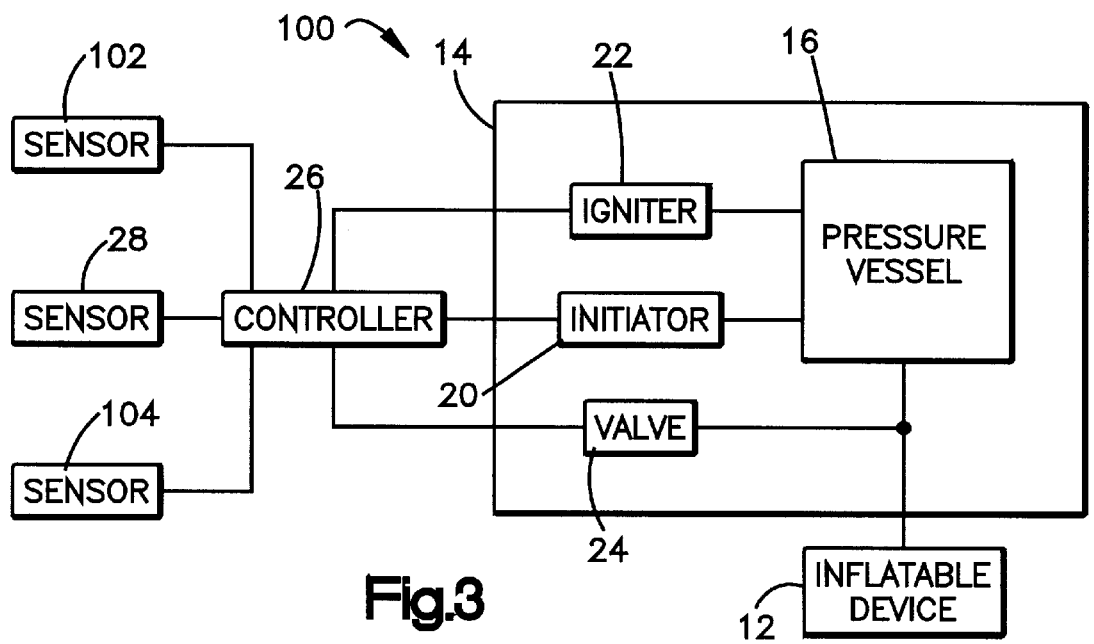
FIG. 3 is a schematic view of a vehicle occupant protection apparatus comprising a second embodiment of the invention.

A vehicle occupant protection apparatus 100 comprising a second embodiment of the present invention is shown schematically in FIG. 3. The apparatus 100 includes an occupant condition sensor 102 and a temperature sensor 104 in addition to the crash sensor 28 of FIG. 1. The apparatus 100 is otherwise the same as the apparatus 10, as indicated by the use of the same reference numbers in FIGS. 3 and 1.

The occupant condition sensor 102 may comprise any known device that provides a signal indicating a vehicle occupant condition such as, for example, an occupant's size, weight and/or position. Other vehicle occupant conditions include the occupant's presence in the vehicle and the occupant's use of a seat belt, as indicated by a seat belt buckle switch or the like. In each case, the sensor 102 provides the controller 26 with an additional deployment signal that the controller 26 uses, along with the deployment signal received from the crash sensor 28, to select a stage of actuation for the initiator 20, the igniter 22, and the solenoid valve 24.

The temperature sensor 104 provides a deployment signal indicating the ambient temperature at the inflator 14. Since the ambient temperature at the inflator 14 can affect the pressure of the inflation fluid stored in the pressure vessel 16, it can affect the flow rate at which the inflation fluid exits the pressure vessel 16. The controller 26 in the second embodiment may thus select a stage of actuation for the initiator 20, the igniter 22, and the solenoid valve 24 with reference to the occurrence and severity of a vehicle crash, and with further reference to a condition of a vehicle occupant and/or the ambient temperature at the inflator 14.

From the above description of the invention, those skilled in the art will perceive improvements, changes and modifications. For example, the deployment conditions sensed by the sensors 28, 102 and 104 are described by way of example only. Other vehicle or vehicle occupant conditions also could be used as deployment conditions for selecting an actuation stage for an initiator assembly in accordance with the present invention. Such improvements, changes and modifications within the skill of the art are intended to be covered by the appended claims.

Having described the invention, the following is claimed:

1. Apparatus comprising:

an inflator, said inflator comprising a pressure vessel, a burst disk blocking fluid flow from said pressure vessel and rupturable to enable fluid to flow from said pressure vessel, said burst disk being centered on a central axis along the longitudinal length of said inflator, a valve that regulates an outlet flow from said pressure vessel, said valve normally having an open condition providing an initial outlet flow area, said valve being movable in a direction transverse to said central axis; and means for responding to a vehicle crash by shifting said valve to a further opened condition providing a subsequent outlet flow area greater than said initial outlet flow area, said shifting of said valve being unaffected by inflation fluid pressure forces acting on said valve.

2. Apparatus as defined in claim 1 wherein said valve is a solenoid valve.

3. Apparatus as defined in claim 1 wherein said inflator includes a diffuser having outlet flow openings; said valve being located in an inflation fluid flow path between said pressure vessel and said outlet flow openings in said diffuser.

* * * * *